Dec. 17, 1963 W. M. CAREY, JR 3,114,896

MULTI-DIRECTIONAL STORAGE REGISTER

Filed June 8, 1956 3 Sheets-Sheet 1

INVENTOR.
WILLIAM M. CAREY, JR.
BY Henry L. Hanson
ATTORNEY

Dec. 17, 1963 W. M. CAREY, JR 3,114,896

MULTI-DIRECTIONAL STORAGE REGISTER

Filed June 8, 1956 3 Sheets-Sheet 2

INVENTOR.
WILLIAM M. CAREY, JR.
BY Henry L. Hanson
ATTORNEY

INVENTOR.
WILLIAM M. CAREY, JR.
BY Henry L. Hanson
ATTORNEY

United States Patent Office 3,114,896
Patented Dec. 17, 1963

3,114,896
MULTI-DIRECTIONAL STORAGE REGISTER

William M. Carey, Jr., South Lincoln, Mass., assignor, by mesne assignments, to Minneapolis-Honeywell Regulator Company, a corporation of Delaware
Filed June 8, 1956, Ser. No. 590,192
17 Claims. (Cl. 340—174)

Figure 1:
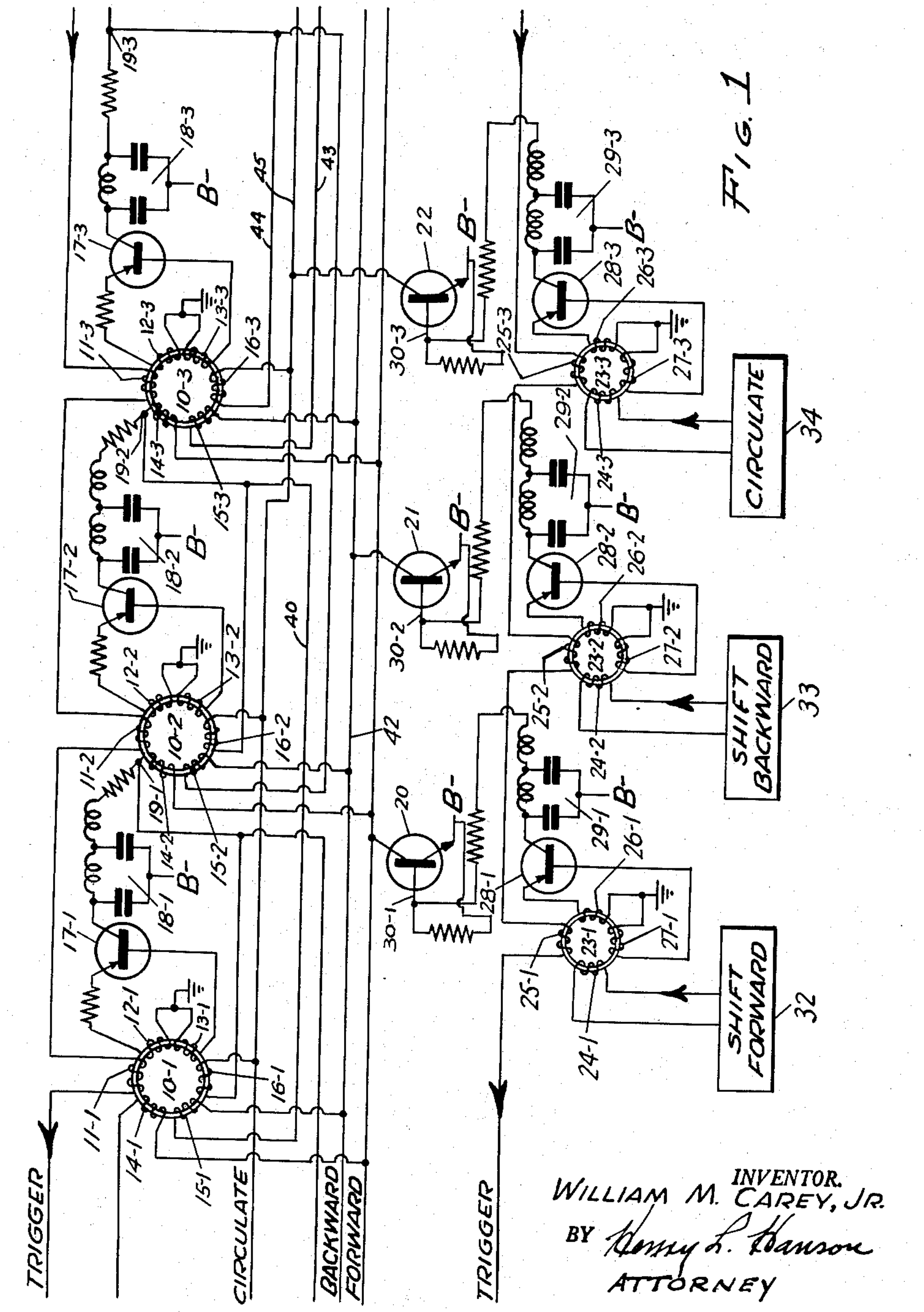

A general object of the present invention is to provide a new and improved information storage and transfer apparatus. More specifically, the present invention is concerned with a new and improved multi-dimensional shift register which is adapted for shifting stored electrical impulses to any of a plurality of different positions within the register.

Shift registers have received wide application in digital type circuitry where information is stored and moved within the circuitry in the form of electrical pulses. In digital circuitry employing the binary numbering system, the presence or absence of a pulse serves to indicate a binary "1" or "0". These current pulses which represent information may be used to set the magnetization of a magnetic core in one or the other of two static states of magnetization. The application of a shift pulse to the magnetic core by way of a shift winding will shift the magnetization of the core, if a signal had been stored therein, so that a pulse will be produced in an output winding. Shift registers embodying these basic principles are well known in the art and an article discussing their general form and application is an article by S. Guterman et al. entitled "Logical and Control Functions Performed With Magnetic Cores," to be found in the proceedings of the I.R.E., Volume 43, Number 3, March, 1955, pages 291–298.

The shift register concept incorporated in the present invention is of the type set forth in the above article and incorporates an extension of the principles therein to a register where information stored may be shifted in a plurality of directions or may be circulated within a fixed segment of the register.

The handling of information in data processing machines of the digital type requires that the information be readily transferred quickly and by the most direct route to appropriate utilization apparatus. This information transfer apparatus must be very flexible to insure maximum machine efficiency. One way to achieve flexibility is to arrange the circuit so that the information may be moved in a plurality of different directions within a shift register line or in a matrix type of storage line. Carried to its logical extreme, the information may be moved to any position in a three-dimensional storage register and transferred out as desired. Although not limited thereto, the present invention is disclosed as incorporating magnetic cores and associated circuitry to provide a multi-dimensional information storage and transfer circuit.

It is accordingly a more specific object of the present invention to provide a multi-dimensional information storage and shift register circuit incorporating magnetic cores for storing the information in combination with a circuit means for efficiently transferring stored information to any desired position in the register.

The foregoing objects of the present invention are achieved by a novel circuit arrangement where a magnetic core has a plurality of input windings thereon which are arranged to be selectively gated so that an information pulse generated within the circuit may be moved to selectively gated input windings to store information. A very effective gating means having good current gating characteristics is a transistor. As used in the present circuit, the transistor is adapted to have a current path therethrough opened up at a selected instant so that a current signal will pass and be applied to an input winding on a selected core in the register. By providing a plurality of transistor gating devices and associating the gating device with selected input windings, it is possible to direct the movement of information within the shift register in a plurality of directions limited only by the number of gating circuits provided and the number of windings associated with the individual magnetic cores of the register. This is achieved by using a single shifting pulse source which further simplifies the operation of the circuit.

It is accordingly a more specific object of the present invention to provide a new and improved multi-dimension register incorporating magnetic cores having windings thereon where a gating circuit is associated with each of the windings for selectively directing the flow of information within the register.

Still another more specific object of the present invention is to provide an improved storage register of the multi-dimensional type wherein the information within the register may be moved in any of a plurality of directions and also recirculated in a fixed position within the register.

These and other objects of the present invention will be readily apparent upon a consideration of the following specifications, the claims, and the drawings, the latter of which discloses a preferred embodiment of the invention.

Figure 1A:
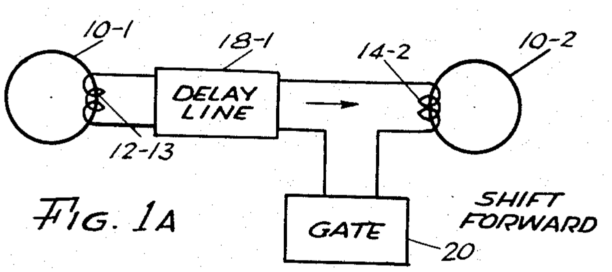
Figure 1B:
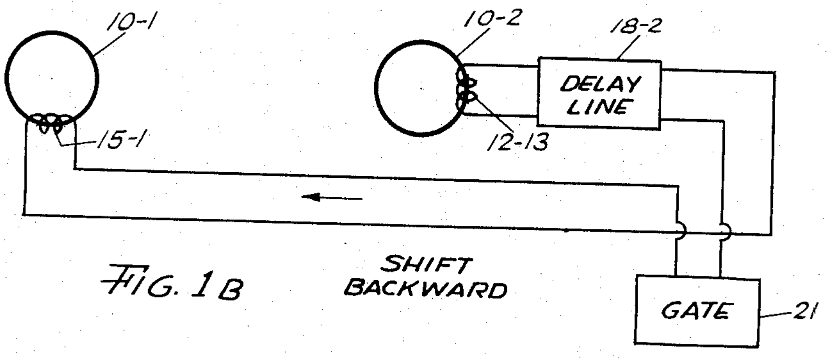
Figure 1C:
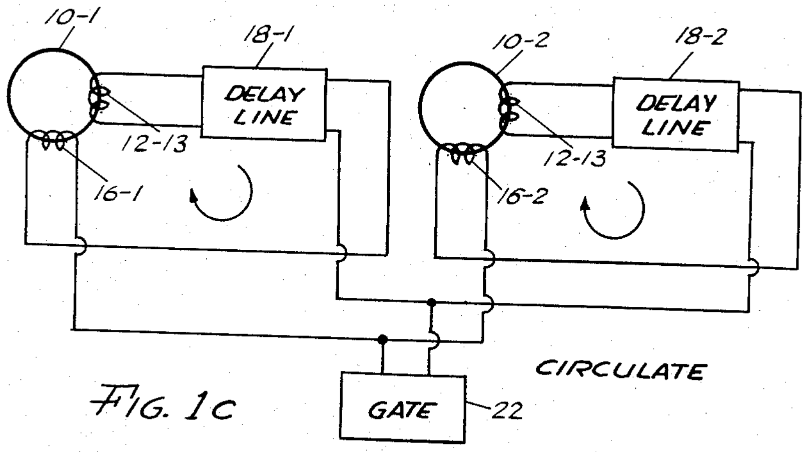
Figure 2:
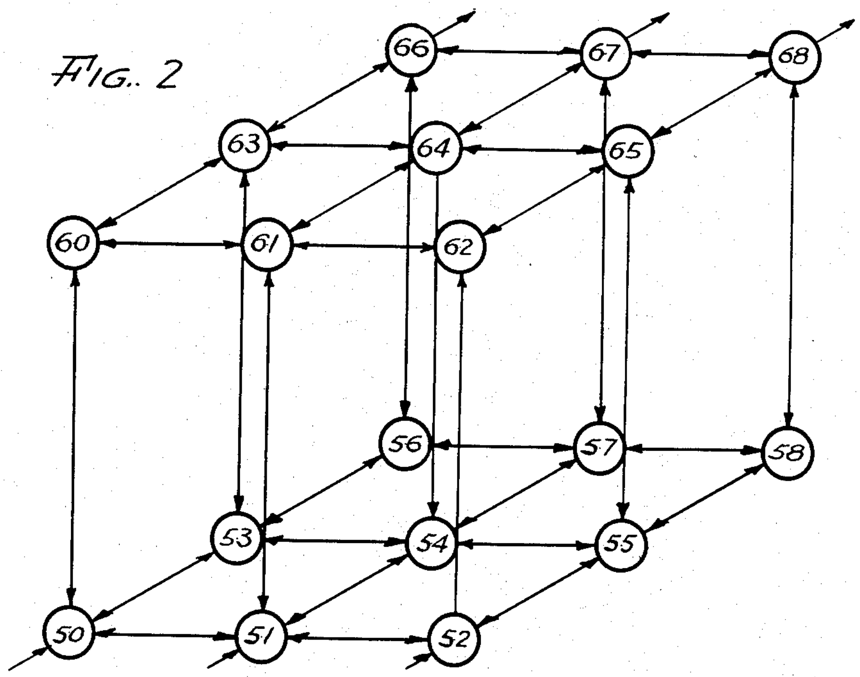
Figure 3:
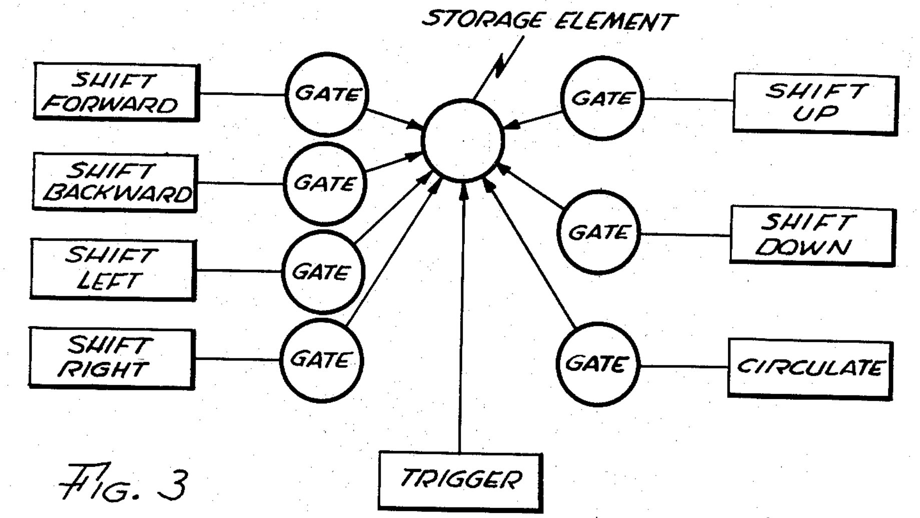

Of the drawings:

FIGURE 1 is a diagrammatic showing of one form of the invention where the principles are applied to a two-dimensional register;

FIGURES 1A, 1B, and 1C show a schematic of the pulse flow circuits of FIGURE 1;

FIGURE 2 is a schematic arrangement of a multi-dimensional register incorporating the principles of the present invention; and FIGURE 3 shows a schematic arrangement for the gating circuits required for the circuit shown in FIGURE 2.

Referring first to FIGURE 1, there are shown here a plurality of magnetic cores 10–1, 10–2 and 10–3. These magnetic cores are preferably formed of core material having a rectangular hysteresis loop with a large residual flux characteristic. Wound on each of the cores 10–1, 10–2, and 10–3 is a trigger or shift winding 11–1, 11–2, and 11–3 respectively. This winding, when a pulse is applied thereto, will cause a shifting of the core magnetization to a fixed or "0" state. If the associated core had a "1" stored therein, the application of the trigger or shift pulse will switch the core back to the "0" state and the switching process will induce an output voltage in the output windings 12 and 13 of each of the cores.

The storage of a "1" in the selected core may be accomplished by applying a suitable current pulse to any of the three input windings on each of the cores identified by the numerals 14, 15 and 16.

The output windings 12 and 13 of each of the cores are coupled to the transistors 17–1, 17–2 and 17–3 which are PNP type transistors. The output of the transistors 17–1, 17–2 and 17–3 are copuled by way of delay lines 18–1, 18–2 and 18–3 to terminals 19–1, 19–2 and 19–3; the latter of which has a plurality of circuits leading therefrom to a number of input windings on the cores of the register as will be explained below.

The windings 12 and 13, the transistors 17 and the cores 10 are so connected that when the trigger or shift pulse appears, the core and transistor form a regenerative amplifier which amplifies the trigger pulse and due to the coupling from the windings, shifts the core to the "0" state. This type of circuit is shown and described in the copending application of S. S. Guterman, Serial Number 471,319, filed November 26, 1954, now U.S. Patent No. 3,017,084.

In order to direct the movement of the information stored in the cores 10, there are provided a plurality of transistor gates 20, 21, and 22 which are of the NPN type. Each of the gates has an associated pulse producing source associated therewith which is adapted to open the gate of the selected circuit when the input circuits thereto are activated. Transistor 20 forms the gate for the shift forward circuit. This shift forward circuit receives a control pulse from a magnetic core device which may be, for example, of the type shown in the shift register discussed above. This circuit comprises a magnetic core 23–1 having wound thereon an input winding 24–1, trigger or shift winding 25–1, and a pair of output windings 26–1 and 27–1. The output windings are coupled to a transistor 28–1 of the PNP type whose output in turn is fed through a delay network 29–1 to the input electrode or base 30–1 of the transistor gate 20. The transistor 28–1 and the core 23–1 function in the above described manner to cause a shifting of the core due to the regenerative action in the combined circuit.

The shift backward gate transistor 21 is controlled by a circuit of the same type controlling the shift forward gate 20 and the components of this circuit carry corresponding reference characters identified by the suffix "2."

The circulate gate transistor 22 is likewise controlled by a circuit similar to that controlling the forward gate 20 and the backward gate 21. Again, the components carry corresponding reference characters with the suffix "3" added thereto.

The signals for the cores 23–1, 23–2, 23–3 may be derived from suitable pulse sources 32, 33, and 34; each of which is adapted to set the associated core to a desired magnetic state when it is desired that a predetermined shift action take place.

In considering the operation of FIGURE 1, it is first assumed that there has been a "1" stored in each of the cores 10–1, 10–2 and 10–3. It is further asumed that it is desired to move these "1's" in the forward direction, or in a left to right direction as shown on the drawing. Since it is desired to shift the information in the forward direction, it is necessary that the shift forward pulse source 32 store a "1" in the core 23–1, and it is further necessary that the cores 23–2 and 23–3 be set in the "0" state. When a trigger or shift pulse is applied to the register cores 10–1, 10–2 and 10–3 the cores will be reset from the "1" state to the "0" state and the switching operation will produce a signal in the output windings 12 and 13 which will be effective, with the transistor 17, to charge up the condenser on the forward end of the filter 18. The charge on the condenser will tend to discharge through the filter and through the input winding 14 of the next core in the series and then through the gate 20 to the B minus terminal which also connects to the filter 18. It will be apparent that current will flow through the winding 14 to the B minus side of the filter 18 only if the transistor gate 20 is open.

The opening of the transistor gate 20 will be accomplished if the shift forward pulse source has stored a "1" in the core 23–1 and the trigger pulse has moved that "1" out through the output windings 26–1 and 27–1 to the transistor 28–1 and then into the filter 29–1. The delay line or filter 29–1 will cause the output pulse therefrom to be applied to the input electrode 30–1 of the transistor gate 20 at the instant that the signal in the filter 18–1 has reached the input windings 14–2 and the signal in the filter 18–2 has reached the input winding 14–3. Since the cores 10 will have a pulse applied thereto by the windings 14, the cores 10–2 and 10–3 will again be set with a "1" which has been moved thereto from the core to its left.

FIGURE 1A shows the basic shift forward circuit of FIGURE 1 in simplified schematic detail with only the elements appearing in the transfer path included. Thus, when a pulse is produced in the coil combination 12—13 of core 10–1, it is transferred to the delay line 18–1. The output of the delay line is coupled to the input coil 14–2 of core 10–2 when the gate 20 is opened so that the pulse may be read into the core 10–2. As only gate 20 is opened, then no other core winding will be energized.

It will thus be seen that information stored in the cores 10–1, 10–2, and 10–3 can be shifted from left to right by the application of the trigger pulses and the opening of the forward gate transistor 20. This shifting of the information from left to right may be accomplished in any number of cores, the limit being solely the current handling capacity of the particular switching gate. Obviously parallel switching gate transistors may be used in order to increase the current handling capacity of the gate 20.

When it is desired to shift the information from right to left, or in a backward direction, the shift backward pulse generator 33 will store a "1" in the core 23–2. When the next trigger pulse or shift pulse is received on the shift register cores 10, and on the gate core 23–2, the information in each of the cores will be read out to the associated transistor and delay line. When the pulse on the transistor 28–2 is passed through the delay line 29–2 to the input electrode 30–2 of the backward transistor gate 21, the pulses on the output of each of the filters 18–1, 18–2 and 18–3 will have reached the terminal points 19–1, 19–2 and 19–3. As it is desired to shift the information from core 10–2 back to the core 10–1, it will be readily apparent that a circuit must be traced from the output terminal 19–2 to the winding 15–1 of the core 10–1. The circuit will be completed by way of lead 40, winding 15–1, lead 42, and the backward gate transistor 21 back to the B minus supply on the filter 18–2.

A similar circuit may be traced insofar as the information stored in core 10–3 is concerned. When an output pulse is produced in this core due to a "1" stored in the core, this pulse will be applied to the filter 18–3 and filter 18–3 and fed back to the lead 43 to the winding 15–2 to lead 42 and the backward gate transistor 21 to B-minus which connects back to the B-minus on the filter 18–3.

FIGURE 1B shows the basic shift backward circuit of FIGURE 1, again showing in the schematic detail only those elements used in the pulse transfer path. Here, when a pulse is read out of the core 10–2, the pulse will pass into the delay line. From the delay line, the pulse will go to the input winding 15–1 when gate 21 is opened.

It is accordingly apparent that the information stored in the shift register cores 10 may be shifted from right to left whenever the backward transistor gate 21 is opened and the other gates are closed.

In a similar manner, should it be desired to circulate the information stored in the shift register cores 10 so that the information will, in effect, be held in the respective cores without shifting from left to right or from right to left, it is but necessary to generate a circulate pulse 34 and store the pulse in the core 23–3. When the next trigger pulse is received in the circuit, the signal stored in the core 23–3 will be read out through the associated transistor and delay line to open the circulate transistor gate 22. When this particular gate is opened, the information read out of the respective shift register cores 10 will be read back into the cores by way of the input windings 16. The circuit for this may be traced for core 10–3 by following the current discharge of the delay line 18–3 through the output terminal 19–3, the lead 44, winding 16–3 on core 10–3, and lead 45 through the transistor gate 22 to the B minus side of the filter 18–3. A similar circuit may be traced for each of the cores 10–1, 10–2. As before, it will be readily apparent that a large number of cores may be operated in a similar manner to circulate the information within the cores.

FIGURE 1C shows the basic elements used in FIGURE 1 where the pulse read out of the respective cores 10–1 and 10–2 is recirculated back into the same cores. As shown in this figure, the outputs of the respective delay lines 18-1 and 18-2, when they have had a pulse applied to their inputs, will produce a feedback pulse to the windings 16-1 and 16-2 if the gate 22 is opened.

While a particular type of gating circuit has been shown in FIGURE 1, it will be readily apparent that the gating circuit may take any of several possible forms such as the application of a gate pulse directly to the switching transistors, 20, 21, and 22 without the use of the core storage element 23, transistors 28, and delay lines 29.

Referring now to FIGURE 2, there is here shown in schematic form a multi-dimensional shift register incorporating 18 storage positions, each of which may be of the type shown in FIGURE 1 and identified by the numerals 10 through 19. As shown in FIGURE 2, the register has been divided into two planes with the storage positions in the first plane being identified by the numerals 50 through 58. Storage positions of the register of the second plane are identified by the numeral 60 through 68. In accordance with the principles set forth in FIGURE 1, it is possible to move information into any of the storage positions and to shift this information to any other desired position within the register. For example, if a "1" should be read into each of the storage positions 50, 51, and 52, these "1's" may be moved into the storage positions 53, 54 and 55 or may be read into the storage positions 60, 61 and 62. On the occurrence of the next shift pulse in the register, the information in the storage positions 53, 54 and 55 may then be transferred forward into the storage positions 56, 57, and 58. Further, the information in the storage elements 53, 54, and 55 may be shifted to the storage positions 63, 64, and 65. Similarly, the information in the storage elements 53, 54, and 55 may be shifted backward into the storage positions 50, 51, and 52.

It will be readily apparent that this shifting of the information may be accomplished in any desired direction within the confines of the number of storage elements of the register and the number of directions and interconnections between the respective elements of the register.

As shown in FIGURE 3, each of the storage elements embodied in FIGURE 2, in order to accomplish a three-dimensional shift and a circulate, must include gating circuitry for each of the directions in which it is desired to shift as well as a circulate gate. Thus, to obtain a shift forward, a shift backward, a shift left, a shift right, a shift up, a shift down, as well as a circulate, it is necessary to provide seven separate gates for seven separate input windings on the core of the associated storage element. In addition, a trigger winding will be required on the register core in order to effect the transfer of information out of the core in the manner set forth above in connection with FIGURE 1.

It will be readily apparent that the principles set forth in FIGURES 2 and 3 may be applied to shifting information within the storage register of FIGURE 2 and other directions such as, for example, between the storage elements 50, 51 and 52 and the elements 63, 64, and 65. Such an arrangement would obviously require an additional set of windings on the storage elements as well as suitable gates for opening up the circuits which couple the information between the storage elements.

From the foregoing, it will be apparent that there has been described a new and improved multi-dimensional shift register and storage register which is simple and yet very flexible in providing an information transfer and storage means. While a preferred embodiment of the invention has been shown, it will be readily apparent to those skilled in the art that changes may be made in the invention without departing from the spirit thereof. Accordingly, it is intended that the invention be limited solely by the scope of the appended claims. What is claimed and for which it is desired to secure by Letters Patent is:

1. A multi-directional shift register comprising a plurality of bi-stable magnetic cores whose individual bi-stable state is indicative of stored information, a single source of shift pulses for said register, a shift winding wound on each of said cores, an output winding on each of said cores, an amplifier connected to each of said output windings and adapted to produce an output when information is to be shifted out of the associated core, a first directional input winding wound on each of said cores, a second directional input winding wound on each of said cores, a feedback winding wound on each of said cores and connected between the output of the associated amplifier and the core, and selectively actuated gating means connected in circuit with said first input winding, said second input winding and said feedback winding to control the direction of information transfer in said register or the recirculation of the information into the individual cores.

2. A multi-directional shift register comprising a plurality of bi-stable magnetic cores whose individual bi-stable state is indicative of stored information, a single source of shift pulses for said register, a shift winding wound on each of said cores, an output winding on each of said cores, a transistor connected to each of said output windings and adapted to produce an output when information is to be shifted out of the associated core, a first directional input winding wound on each of said cores, a second directional input winding wound on each of said cores, a feedback winding wound on each of said cores and connected between the output of the associated transistor and the core, and selectively actuated transistor gating means connected in circuit with said first input winding, said second input winding and said feedback winding to control the direction of information transfer in said register or the recirculation of the information back into the individual cores.

3. A multi-directional shift register comprising a plurality of bi-stable magnetic cores whose individual bi-stable state is indicative of stored information, a single source of shift pulses for said register, a shift winding wound on each of said cores, an output winding on each of said cores, an amplifier connected to each of said output windings and adapted to produce an output when information is to be shifted out of the associated core, a first directional input winding wound on each of said cores, a second directional input winding wound on each of said cores, a feedback winding wound on each of said cores and connected between the output of the associated amplifier and the core, and selectively actuated gating means connected in circuit with the first input winding, the second input winding and the feedback winding to control the direction of information transfer in said register or the recirculation of the information into the individual cores, said gating means comprising an electronic switch having a pulse input circuit for opening said gating means.

4. A multi-dimensional shift register comprising a plurality of bi-stable storage elements whose bi-stable state is indicative of the information stored in the element, a shift signal source, a shift input means connected to each of said elements and connected to said shift signal source, a plurality of directional input circuits connected to each of said elements, each of said input circuits being adapted to direct the shifting of information stored in said elements in a selected direction with respect to the other elements when a shift signal is derived from said signal source, a plurality of gating means connected in series with each of said directional input circuits, means for rendering a selected one of said gating means conductive in synchronism with the arrival of information from said elements, and means for shifting said information normally non-conductive in the same direction simultaneously with respect to all of the elements in said register.

5. A shift register comprising a plurality of information storage and transfer elements, each of said elements comprising a magnetic core capable of storing information in accordance with whether it is in a first or a second magnetic state, a plurality of windings on each core, an amplifier device connected to be energized by one winding of said core, and a delay circuit in the output of said amplifier device; output circuit means connecting the output of each of said delay circuits to an input winding of at least two other elements; a shift winding on each of the cores and adapted to be simultaneously active on all of said cores to transfer the information therein simultaneously, a gating means connected to said circuit means comprising a further one of said elements, a transistor switching device in series with one of said output circuit means and biased to be normally non-conductive, means connecting the delay circuit of said last named element to said switching device and means for selectively rendering said transistor switching device conductive in synchronism with the arrival of the information from said first-recited elements.

6. A shift register comprising a plurality of information storage and transfer elements, each of said elements comprising a magnetic core capable of storing information in accordance with whether it is in a first or a second magnetic state, a plurality of windings on each core, an amplifier device connected to be energized by one winding of each of said cores, and a delay circuit in the output of said amplifier device; output circuit means connecting the output of each of said delay circuits to an input winding of at least two other elements, a shift winding on each of the cores and adapted to be simultaneously active on all of said cores to transfer the information therein; and a gating means connected to selectively activate a selected portion of said circuit means to control the direction of information transfer in said register.

7. A shift register comprising a plurality of information storage and transfer elements, each of said elements comprising a magnetic core capable of storing information in accordance with whether it is in a first or a second magnetic state, a plurality of windings on each core, an amplifier device connected to be energized by one winding of each of said cores, and a delay circuit in the output of said amplifier device; circuit means connecting the output of each said delay circuits to an input winding of at least two other elements and an input winding of said element; a shift winding on each of the cores and adapted to be simultaneously active on all of said cores, and a gating means connected to selectively activate a selected one of said circuit means to control the direction of information transfer in said register on the recirculation of the information in said register.

8. An N-directional shift register comprising a plurality of storage and transfer elements, a shift signal input having a common source connected to each of said elements, N-directional inputs for each of said elements, an output on each of said elements, N gate means coupling each of said outputs in series with the inputs on selected ones of said elements, input control means for selectively actuating one of said gate means in synchronism with the arrival of information from said elements, and means for effecting the transfer of stored information in the same direction simultaneously with respect to all of said elements.

9. A reversible shift register comprising a plurality of magnetic members each capable of being magnetically saturated in either one of two stable conditions of saturation in response to applied energizing current pulses of a first polarity sense or of another polarity sense, forward and reverse unidirectional information transfer circuit means intercoupling adjacent ones of said members for applying signal energizing current pulses of a selected one polarity from any member to either adjacent member, means for applying a shift energizing current pulse to all of said members simultaneously in a polarity sense opposite that of said signal energizing current pulses, a non-magnetic storage element included in said information transfer circuit means for intercepting and storing said signal energizing current pulses, said transfer circuit means having forward and reverse gating means to be activated for preventing the application of said signal energizing current pulse from said storage element to either adjacent member until after the termination of said shift energizing current pulse, and means for deactivating a selected one only of said forward and reverse gating means after termination of said shift energizing current pulse to thereby transfer the signal energizing current pulse stored in the respective storage element to a selected one of said adjacent members to thus provide forward or reverse shift registration.

10. A reversible shift register comprising a plurality of magnetic members each capable of being magnetically saturated in either one of two stable conditions of saturation in response to applied energizing current pulses of a first polarity sense or of another polarity sense, forward and reverse unidirectional information transfer circuit means intercoupling adjacent ones of said members for applying signal energizing current pulses of a selected one polarity from any member to either adjacent member, coupling winding means for applying a shift energizing current pulse to all of said members simultaneously in a polarity sense opposite that of said signal energizing current pulses, a non-magnetic storage element included in said information transfer circuit means for intercepting and storing said signal energizing current pulses, said transfer circuit means having forward and reverse gating means to be activated for preventing the application of said signal energizing current pulse from said storage element to either adjacent member until after the termination of said shift energizing current pulse, and means for deactivating a selected one only of said forward and reverse gating means after termination of said shift energizing current pulse to thereby transfer the signal energizing current pulse stored in the respective storage element to a selected one of said adjacent members to thus provide forward or reverse shift registration.

11. A reversible shift register comprising a plurality of magnetic members each capable of being magnetically saturated in either one of two stable conditions of saturation in response to applied energizing current pulses of a first polarity sense or of another polarity sense, forward and reverse unidirectional information transfer circuit means intercoupling adjacent ones of said members for applying signal energizing current pulses of a selected one polarity from any member to either adjacent member, coupling winding means for applying a shift energizing current pulse to all of said members simultaneously in a polarity sense opposite that of said signal energizing current pulses, a shunt capacitor included in said information transfer circuit means for intercepting and storing said signal energizing current pulses, said transfer circuit having forward and reverse gating means to be activated for preventing the application of said signal energizing current pulse from said storage element to either adjacent member until after the termination of said shift energizing current pulse, and means for deactivating a selected one only of said forward and reverse gating means at the termination of said shift energizing current pulse to thereby transfer the signal energizing current pulse stored in the respective capacitor to a selected one of said adjacent members to thus provide forward or reverse shift registration.

12. A control chain comprising a plurality of bistable magnetic cores; a plurality of active pulse producing coupling elements, each responsive to a corresponding one of said cores; first means coupling an output of each said element to the corresponding core; second means coupling said output to the preceding core of said chain; third means coupling said output to the succeeding core of said chain; and means for selectively energizing each said first, second and third means for controlling the stop, reverse, and forward operation of said chain.

13. A control chain comprising a plurality of bistable magnetic delay devices, means for performing logical functions at the input of each said device, and further means including a plurality of semiconductor pulse producing coupling elements intercoupling said devices for controlling a stop, forward and reverse operation of said chain.

14. The apparatus as claimed in claim 13 wherein each said coupling element comprises a semiconductor bistable trigger circuit for providing an output pulse and a further pulse for operating the devices in controlling the stop, forward and reverse operation in said chain.

15. A control chain comprising a plurality of bistable magnetic cores, means for performing logical functions at the input of said cores, a plurality of active coupling elements intercoupling adjacent cores of said chain comprising a monstable device for producing an output pulse having a predetermined pulse width controlled by said circuit.

16. A control chain comprising a plurality of bistable magnetic cores; a monostable blocking oscillator coupled to each core; first, second and third windings on each core; means coupling the output of each blocking oscillator to said first winding of the core associated therewith; means coupling said output to said second winding of the preceding core of said chain; means coupling said output to the third winding of the succeeding core of said chain, first switching means connected to each of said first windings to control the current path thereof; second switching means coupled to each said second winding to control the current path thereof; and third switching means connected to each said third winding for controlling the current path thereof, whereby said first, second and third switching means control the interruption, forward and reverse operation of said chain.

17. An electrical circuit comprising a plurality of bistable magnetic cores each having a plurality of windings thereon including an advance winding, an output winding and first, second and third transfer windings, an active pulse producing coupling element coupled to the output winding of each of said cores and including an output terminal for manifesting an output pulse in response to an input pulse received from said output winding, means coupling said output terminal to said first winding of the preceding core of said chain, means coupling said output terminal to said second transfer winding of the core associated with said coupling element, means coupling said output terminal to said third transfer winding of the succeeding core of said chain, transistor switching means connected to each of said first transfer windings for controlling the current path therethrough, second transistor switching means coupled to each of said second transfer windings for controlling the current path therethrough, and third transistor switching means coupled to each of said third transfer windings for controlling the current path therethrough whereby said first, second and third transistor switching means respectively control the reverse advance, the stoppage and the forward advance of said chain.

References Cited in the file of this patent

UNITED STATES PATENTS

| | | |
|---|---|---|
| 2,652,501 | Wilson | Sept. 15, 1953 |
| 2,708,722 | An Wang | May 17, 1955 |
| 2,747,110 | Jones | May 22, 1956 |
| 2,760,088 | Pittman et al. | Aug. 21, 1956 |
| 2,785,390 | Rajchman | Mar. 12, 1957 |
| 2,834,007 | Smith | May 6, 1958 |
| 2,863,138 | Hemphill | Dec. 2, 1958 |
| 2,866,178 | Lo et al. | Dec. 23, 1958 |

OTHER REFERENCES

A Predetermined Scaler Utilizing Transistors and Magnetic Cores, by R. I. Van Nice et al. Proceedings of the National Electronics Conference, October 3–5, 1955, vol. XI, pp. 859–869.